(12) United States Patent
Yao et al.

(10) Patent No.: US 9,349,330 B2
(45) Date of Patent: May 24, 2016

(54) PIXEL STRUCTURE, LIQUID CRYSTAL DISPLAY PANEL AND DRIVING METHOD THEREOF

(71) Applicant: Shenzhen China Star Optoelectronics Technology Co., Ltd., Shenzhen, Guangdong (CN)

(72) Inventors: Xiaohui Yao, Shenzhen (CN); Je-hao Hsu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 207 days.

(21) Appl. No.: 14/232,263

(22) PCT Filed: Jun. 28, 2013

(86) PCT No.: PCT/CN2013/078355
§ 371 (c)(1),
(2) Date: Jan. 11, 2014

(87) PCT Pub. No.: WO2014/190585
PCT Pub. Date: Dec. 4, 2014

(65) Prior Publication Data
US 2015/0002561 A1 Jan. 1, 2015

(30) Foreign Application Priority Data

May 31, 2013 (CN) .......................... 2013 1 0213991

(51) Int. Cl.
*G09G 5/02* (2006.01)
*G09G 3/36* (2006.01)
*G02F 1/1362* (2006.01)

(52) U.S. Cl.
CPC ........ *G09G 3/3607* (2013.01); *G02F 1/136213* (2013.01); *G02F 1/136286* (2013.01); *G09G 3/3648* (2013.01); *G09G 3/3659* (2013.01); *G02F 1/1362* (2013.01); *G02F 2001/13629* (2013.01); *G09G 2300/0447* (2013.01); *G09G 2300/0465* (2013.01); *G09G 2300/08* (2013.01); *G09G 2320/028* (2013.01)

(58) Field of Classification Search
None
See application file for complete search history.

(56) References Cited

U.S. PATENT DOCUMENTS

2007/0058123 A1* 3/2007 Um ....................... G02F 1/1343
349/144
2011/0115998 A1* 5/2011 Liao ................... G02F 1/136213
349/38
2012/0147282 A1* 6/2012 Shin ..................... G02F 1/13624
349/38

FOREIGN PATENT DOCUMENTS

CN 102566173 A 7/2012

* cited by examiner

*Primary Examiner* — Ilana Spar
*Assistant Examiner* — Kirk Hermann
(74) *Attorney, Agent, or Firm* — Andrew C. Cheng

(57) ABSTRACT

The invention provides a pixel structure, including a plurality of pixel units; each pixel unit including: a first, second and third pixel areas, adjacently disposed. First pixel area includes first pixel electrode and first control switch. Second pixel area includes second pixel electrode and second control switch. Third pixel area includes third pixel electrode and third control switch. Third pixel electrode is connected to data signal sequentially through third and the second control switches. Third pixel electrode is connected to second pixel electrode through third control switch so as to make the voltage level at first pixel electrode different from voltage level at second pixel electrode when first control switch, second control switch and third control switch are all conductive.

13 Claims, 3 Drawing Sheets

PIXEL STRUCTURE, LIQUID CRYSTAL DISPLAY PANEL AND DRIVING METHOD THEREOF

BACKGROUND OF THE INVENTION

1. Field of the Invention

The present invention relates to the field of liquid crystal displaying techniques, and in particular to a pixel structure, a liquid crystal display panel and a driving method thereof.

2. The Related Arts

When using multi-domain vertical alignment type liquid crystal display panel as a display panel of a liquid crystal display, because the orientations of the liquid crystal are different at different observation angles, the liquid crystal display panel may experience color distortion when viewing at a large angle. To improve the color distortion problems at large viewing angle, when a pixel structure is designed, a pixel (red, green or blue) is divided into two parts: the first pixel area and the second pixel area. The distortion at large viewing angle is improved by controlling the voltage of two areas, generally known as low skew designs.

The low skew design is divided into mainly two categories. One category is by increasing the data lines to control the first pixel area and the second pixel area, respectively. The drawback is the increased number of drivers, resulting in increased costs. The other category is to design capacitors on the array substrate for controlling the inconsistency voltage levels of the first pixel area and the second pixel area of the potential inconsistencies, to achieve low color skew design. However, because the design of the array substrate capacitors will reduce the aperture ratio of the pixel structure, the display effect will be poor.

Thus, it is desired to provide a pixel structure, a liquid crystal display panel and a driving method thereof to solve the above problems.

SUMMARY OF THE INVENTION

The technical issue to be addressed by the present invention is to provide a pixel structure, a liquid crystal display panel and a driving method thereof, which realizes low skew effect without reducing aperture ratio of the pixel structure so as to avoid color distortion problem at a large viewing angle.

The present invention provides a pixel structure, which comprises: a plurality of pixel units arranged in a matrix form; each of the pixel units further comprising: a first pixel area, a second pixel area and a third pixel area, adjacently disposed; the first pixel area further comprising: a first pixel electrode and a first control switch, and the first pixel electrode connected to a data signal through the first control switch; the second pixel area further comprising: a second pixel electrode and a second control switch, and the second pixel electrode connected to a data signal through the second control switch; the control terminal of the first control switch and the control terminal of the second control switch being both connected to a first scan signal; the third pixel area further comprising: a third pixel electrode and a third control switch, and the third pixel electrode connected to a data signal sequentially through the third control switch and the second control switch; the control terminal of the third control switch connected to a second scan signal; the third pixel electrode connected to the second pixel electrode through the third control switch so as to make the voltage level at the first pixel electrode different from the voltage level at the second pixel electrode when the first control switch, the second control switch and the third control switch being all conductive.

According to a preferred embodiment of the present invention, the pixel structure comprises an array substrate and a color filter substrate, disposed oppositely, and a liquid crystal layer sandwiched between the array substrate and the color filter substrate; wherein the first pixel area, the second pixel area and the third pixel area are disposed on the array substrate; the color filter substrate is disposed with common electrode; a liquid crystal capacitive voltage divider is formed between the third pixel electrode and the common electrode with the liquid crystal layer as media; the liquid crystal capacitive voltage divider is for lowering the voltage level at the second pixel electrode so that the voltage level at the second pixel electrode is different from the voltage level at the second pixel electrode when the first control switch, the second control switch and the third control switch are all conductive.

According to a preferred embodiment of the present invention, the array substrate further comprises an insulation layer and a storage capacitor electrode, disposed sequentially underneath the first pixel electrode and the second pixel electrode; a first liquid crystal capacitor is formed between the first pixel electrode and the common electrode with the liquid crystal layer as media; a first storage capacitor is formed between the first pixel electrode and the storage capacitor electrode with the insulation layer as media; a second liquid crystal capacitor is formed between the second pixel electrode and the common electrode with the liquid crystal layer as media; a second storage capacitor is formed between the second pixel electrode and the storage capacitor electrode with the insulation layer as media; the common electrode is connected to a first common voltage and the storage capacitor electrode is connected to a second common voltage.

According to a preferred embodiment of the present invention, the first control switch is a first thin-film transistor; the second control switch is a second thin-film transistor; the third control switch is a third thin-film transistor; the first pixel electrode is connected to the drain of the first thin-film transistor; the source of the first thin-film transistor is connected to the data signal; the gate of the first thin-film transistor is connected to the first scan signal; the second pixel electrode is connected to the drain of the second thin-film transistor the source of the second thin-film transistor is connected to the data signal; the gate of the second thin-film transistor is connected to the first scan signal; the third pixel electrode is connected to the drain of the third thin-film transistor; the source of the third thin-film transistor is connected to drain of the second thin-film transistor, and the gate of the third thin-film transistor is connected to the second scan signal.

According to a preferred embodiment of the present invention, the array substrate further comprises a plurality of scan lines disposed transversely, and a plurality of data lines disposed longitudinally; the scan lines intersects with the data lines; the first pixel area of the n-th pixel is disposed in the area surrounded by the n−1th scan line, n-th scan line, n-th data line and n+1th data line; the second pixel area of the n-th pixel is disposed in the area surrounded by the n-th scan line, n+1th scan line, n-th data line and n+1th data line; the third pixel area of the n-th pixel is disposed in the area surrounded by the n+1th scan line, n+2th scan line, n-th data line and n+1th data line; the n-th data line is to provide the data signal to the n-th pixel; the n-th scan line is to provide the first scan signal to the n-th pixel; and the n+1th scan line is to provide the second scan signal to the n-th pixel.

According to a preferred embodiment of the present invention, the second scan signal of the n-th pixel and the first scan signal of the n+1th pixel are the same signal.

The present invention provides a liquid crystal display panel, which comprises: a pixel structure, the pixel structure further comprising: a plurality of pixel units arranged in a matrix form; each of the pixel units further comprising: a first pixel area, a second pixel area and a third pixel area, adjacently disposed; the first pixel area further comprising: a first pixel electrode and a first control switch, and the first pixel electrode connected to a data signal through the first control switch; the second pixel area further comprising: a second pixel electrode and a second control switch, and the second pixel electrode connected to a data signal through the second control switch; the control terminal of the first control switch and the control terminal of the second control switch being both connected to a first scan signal; the third pixel area further comprising: a third pixel electrode and a third control switch, and the third pixel electrode connected to a data signal sequentially through the third control switch and the second control switch; the control terminal of the third control switch connected to a second scan signal; the third pixel electrode connected to the second pixel electrode through the third control switch so as to make the voltage level at the first pixel electrode different from the voltage level at the second pixel electrode when the first control switch, the second control switch and the third control switch being all conductive.

According to a preferred embodiment of the present invention, the pixel structure comprises an array substrate and a color filter substrate, disposed oppositely, and a liquid crystal layer sandwiched between the array substrate and the color filter substrate; wherein the first pixel area, the second pixel area and the third pixel area are disposed on the array substrate; the color filter substrate is disposed with common electrode; a liquid crystal capacitive voltage divider is formed between the third pixel electrode and the common electrode with the liquid crystal layer as media; the liquid crystal capacitive voltage divider is for lowering the voltage level at the second pixel electrode so that the voltage level at the second pixel electrode is different from the voltage level at the second pixel electrode when the first control switch, the second control switch and the third control switch are all conductive.

According to a preferred embodiment of the present invention, the array substrate further comprises an insulation layer and a storage capacitor electrode, disposed sequentially underneath the first pixel electrode and the second pixel electrode; a first liquid crystal capacitor is formed between the first pixel electrode and the common electrode with the liquid crystal layer as media; a first storage capacitor is formed between the first pixel electrode and the storage capacitor electrode with the insulation layer as media; a second liquid crystal capacitor is formed between the second pixel electrode and the common electrode with the liquid crystal layer as media; a second storage capacitor is formed between the second pixel electrode and the storage capacitor electrode with the insulation layer as media; the common electrode is connected to a first common voltage and the storage capacitor electrode is connected to a second common voltage.

According to a preferred embodiment of the present invention, the first control switch is a first thin-film transistor; the second control switch is a second thin-film transistor; the third control switch is a third thin-film transistor; the first pixel electrode is connected to the drain of the first thin-film transistor; the source of the first thin-film transistor is connected to the data signal; the gate of the first thin-film transistor is connected to the first scan signal; the second pixel electrode is connected to the drain of the second thin-film transistor; the source of the second thin-film transistor is connected to the data signal; the gate of the second thin-film transistor is connected to the first scan signal; the third pixel electrode is connected to the drain of the third thin-film transistor the source of the third thin-film transistor is connected to drain of the second thin-film transistor; and the gate of the third thin-film transistor is connected to the second scan signal.

According to a preferred embodiment of the present invention, the array substrate further comprises a plurality of scan lines disposed transversely, and a plurality of data lines disposed longitudinally; the scan lines intersects with the data lines; the first pixel area of the n-th pixel is disposed in the area surrounded by the n−1th scan line, n-th scan line, n-th data line and n+1th data line; the second pixel area of the n-th pixel is disposed in the area surrounded by the n-th scan line, n+1th scan line, n-th data line and n+1th data line; the third pixel area of the n-th pixel is disposed in the area surrounded by the n+1th scan line, n+2th scan line, n-th data line and n+1th data line; the n-th data line is to provide the data signal to the n-th pixel; the n-th scan line is to provide the first scan signal to the n-th pixel; and the n+1th scan line is to provide the second scan signal to the n-th pixel.

According to a preferred embodiment of the present invention, the second scan signal of the n-th pixel and the first scan signal of the n+1th pixel are the same signal.

The present invention provides a driving method of liquid crystal display panel, the liquid crystal display panel, which comprises: a pixel structure, the pixel structure further comprising: a plurality of pixel units arranged in a matrix form; each of the pixel units further comprising: a first pixel area, a second pixel area and a third pixel area, adjacently disposed; the first pixel area further comprising: a first pixel electrode and a first control switch, and the first pixel electrode connected to a data signal through the first control switch; the second pixel area further comprising: a second pixel electrode and a second control switch, and the second pixel electrode connected to a data signal through the second control switch; the control terminal of the first control switch and the control terminal of the second control switch being both connected to a first scan signal; the third pixel area further comprising: a third pixel electrode and a third control switch, and the third pixel electrode connected to a data signal sequentially through the third control switch and the second control switch; the third pixel electrode connected to the second pixel electrode through the third control switch; the control terminal of the third control switch connected to a second scan signal; the driving method of the liquid crystal display panel comprises: using the first scan signal to control the first control switch and the second control switch to become conductive; using the data signal to charge the first pixel area and the second pixel area so that the first pixel electrode and the second pixel electrode forming a first equivoltage level V1; using the second scan signal to control the second control switch and the third control switch to become conductive so that the third pixel electrode and the second pixel electrode are conductive to make the second pixel electrode and the third pixel electrode forming a second equivoltage level V2 different from the first equivoltage level V1.

According to a preferred embodiment of the present invention, the pixel structure comprises an array substrate and a color filter substrate, disposed oppositely, and a liquid crystal layer sandwiched between the array substrate and the color filter substrate; the array substrate further comprises an insulation layer and a storage capacitor electrode, disposed sequentially underneath the first pixel electrode and the second pixel electrode; wherein the color filter substrate is disposed with common electrode; the first pixel area, the second pixel area and the third pixel area are disposed on the array substrate; a liquid crystal capacitive voltage divider CL is formed between the third pixel electrode and the common electrode with the liquid crystal layer as media; a first liquid crystal capacitor CL1 is formed between the first pixel electrode and the common electrode with the liquid crystal layer as media; a first storage capacitor Cs1 is formed between the first pixel electrode and the storage capacitor electrode with the insulation layer as media; a second liquid crystal capacitor CL2 is formed between the second pixel electrode and the common electrode with the liquid crystal layer as media; a second storage capacitor Cs2 is formed between the second pixel electrode and the storage capacitor electrode with the insulation layer as media; the first equivoltage level V1 and the second equivoltage level V2 ahs the relation:

$$V2=V1(CL2+Cs2)/(CL2+Cs2+2CL).$$

According to a preferred embodiment of the present invention, the common electrode is connected to a first common voltage and the storage capacitor electrode is connected to a second common voltage.

The efficacy of the present invention is that to be distinguished from the state of the art. Through the deposition of the third pixel area, the present invention utilizes the liquid crystal capacitive voltage divider formed between the third pixel electrode and the common electrode to lower the voltage level of the second pixel area so that the first pixel area and the second pixel area have different voltage levels. As such, the present invention realizes low skew effect without reducing aperture ratio of the pixel structure so as to avoid color distortion problem at a large viewing angle.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers to drawings and embodiments to describe the present invention in details.

Figure 1:
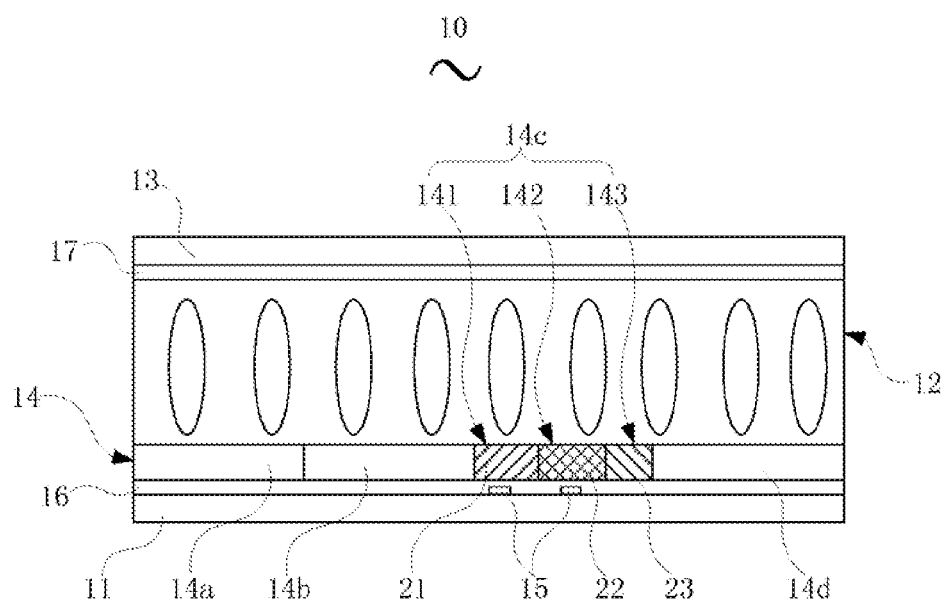
FIG. 1 is a cross-sectional view showing the structure of the pixel of a preferred embodiment according to the present invention.

Referring to FIG. 1, FIG. 1 is a cross-sectional view showing the structure of the pixel of a preferred embodiment according to the present invention. In the instant embodiment, a pixel structure 10 preferably comprises: an array substrate 11, a liquid crystal layer 12 and a color filter substrate 13; wherein the array substrate 11 and the color filter substrate 13 are disposed oppositely and the liquid crystal layer 12 is sandwiched between the array substrate 11 and the color filter substrate 13.

The pixel structure 10 of the present invention comprises a plurality of pixel units 14a, 14b, 14c, 14d, having the same structure for displaying different colors; wherein each of the pixel units further comprising: a first pixel area 141, a second pixel area 142 and a third pixel area 143, adjacently disposed.

The first pixel area 141, the second pixel area 142 and the third pixel area 143 are disposed on the array substrate 11. The array substrate further 1 comprises a storage capacitor electrode 15 and an insulation layer 16, wherein the storage capacitor electrode 15 is disposed underneath the first pixel electrode 141 and the second pixel electrode 142; and the insulation layer 16 covers the storage capacitor electrode 15.

The color filter substrate 13 is disposed with common electrode 17, disposed at the under surface of the color filter substrate 13.

Figure 2:
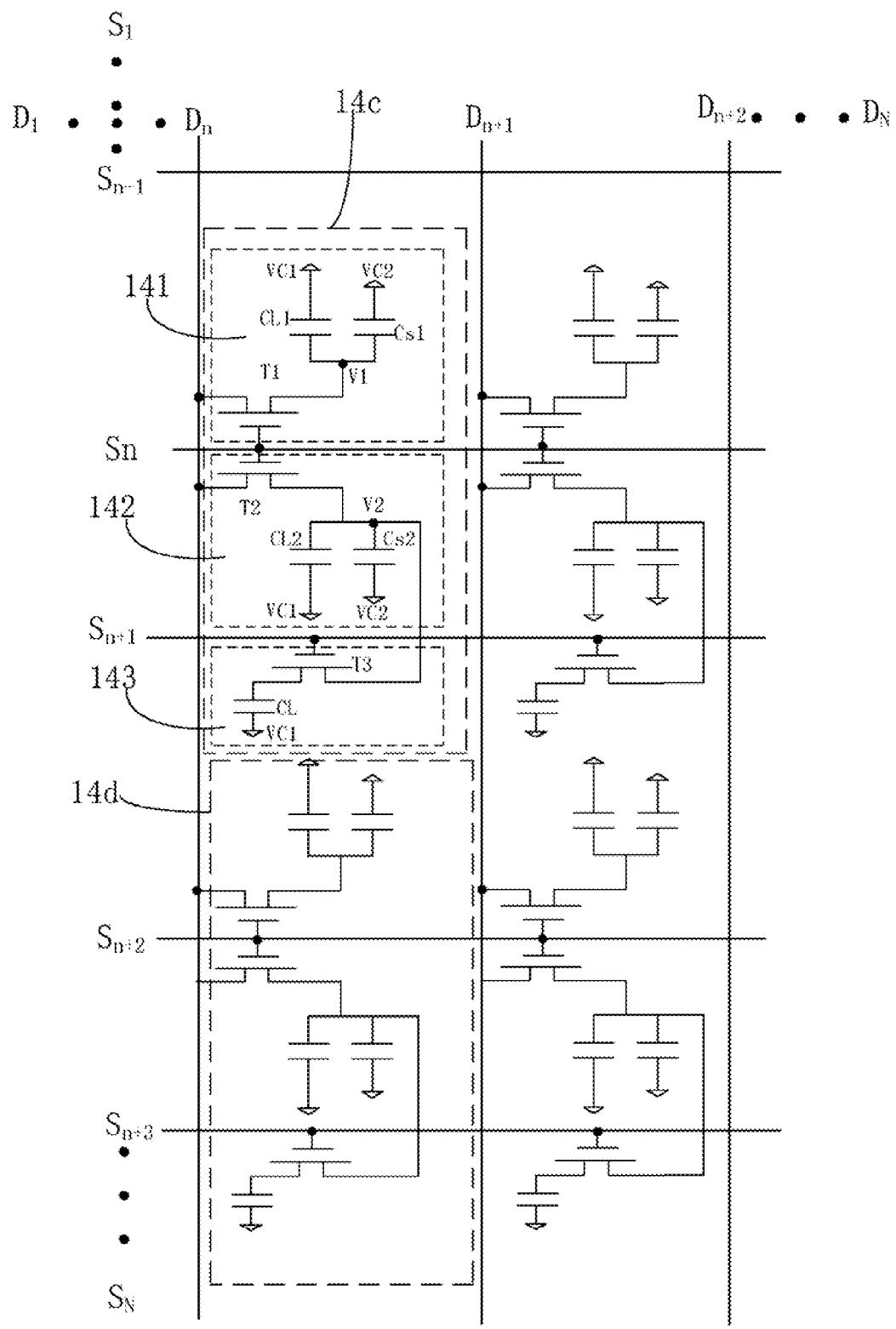
FIG. 2 is a schematic view showing the circuit structure of the pixel structure according to the present invention.

Referring to FIG. 1 and FIG. 2 simultaneously, FIG. 2 is a schematic view showing the circuit structure of the pixel structure according to the present invention. In the instant embodiment, the array substrate 11 is disposed with a plurality of scan lines $S_1$-$S_N$ and a plurality of data line $D_1$-$D_N$. The plurality of scan lines $S_1$-$S_N$ is disposed transversely, and the plurality of data lines $D_1$-$D_N$ is disposed longitudinally. The scan lines and the data lines intersect with each other perpendicularly. In other embodiments, the scan lines and the data lines are not necessarily perpendicular to each other.

The following uses the n-th pixel 14c of FIG. 1 as an exemplar for explanation.

The n-th pixel 14c comprises the first pixel area 141, the second pixel area 142 and the third pixel area 143. The first pixel area 141 of the n-th pixel 14c is disposed in the area surrounded by the n−1th scan line $S_{n-1}$, n-th scan line $S_n$, n-th data line $D_n$ and n+1th data line $D_{n+1}$. The second pixel area 142 of the n-th pixel 14c is disposed in the area surrounded by the n-th scan line $S_n$, n+1th scan line $S_{n+1}$, n-th data line $D_n$ and n+1th data line $D_{n+1}$. The third pixel area 143 of the n-th pixel 14c is disposed in the area surrounded by the n+1th scan line $S_{n+1}$, n+2th scan line $S_{n+2}$, n-th data line $D_n$ and n+1th data line $D_{n+1}$.

The first pixel area 141 further comprises: a first pixel electrode 21 and a first control switch T1, and the first pixel electrode 21 is connected to a data signal through the first control switch T1. In the instant embodiment, the first control switch T1 is preferably a first thin-film transistor T1. The first pixel electrode 21 is connected to the drain of the first thin-film transistor T1; the source of the first thin-film transistor T1 is connected to the data signal; the gate of the first thin-film transistor T1 is the control terminal and is connected to the first scan signal. The n-th data line $D_n$ is to provide the data signal to the n-th pixel 14c; and in other words, the source of the first thin-film transistor T1 is connected to the n-th data line $D_n$. The n-th scan line $S_n$ is to provide the first scan signal to the n-th pixel 14c; and in other words, the gate of the first thin-film transistor T1 is connected to the n-th scan line $S_n$.

The second pixel area 142 further comprises: a second pixel electrode 22 and a second control switch T2, and the second pixel electrode 22 is connected to a data signal through the second control switch T2. In the instant embodiment, the second control switch T2 is preferably a second thin-film transistor T2. The second pixel electrode 21 is connected to the drain of the second thin-film transistor T2; the source of the second thin-film transistor T2 is connected to the data signal; the gate of the second thin-film transistor T2 is the control terminal and is connected to the first scan signal. The n-th data line $D_n$ is to provide the data signal to the n-th pixel 14c; and in other words, the source of the second thin-film transistor T2 is connected to the n-th data line $D_n$. The n-th scan line $S_n$ is to provide the first scan signal to the n-th pixel 14c; and in other words, the gate of the second thin-film transistor T1 is connected to the n-th scan line $S_n$.

The third pixel area 143 further comprises: a third pixel electrode 23 and a third control switch T3, and the third pixel electrode 23 is connected to a data signal sequentially through the third control switch T3 and the second control switch T2. The third pixel electrode 23 is further connected to the second pixel electrode 22 through the third control switch T3. In the instant embodiment, the third control switch T3 is preferably a third thin-film transistor T3. The third pixel electrode 23 is connected to the drain of the third thin-film transistor T3; the source of the third thin-film transistor T3 is connected to drain of the second thin-film transistor T2; and the gate of the third thin-film transistor T3 is the control terminal and is connected to the second scan signal. The n+1th scan line $S_{n+1}$ is to provide the second scan signal to the n-th pixel 14c. In other words, the gate of the third thin-film transistor T3 is connected to the n+1th scan line $S_{n+1}$.

It should be noted that in the instant embodiment, the second scan signal of the n-th pixel 14c and the first scan signal of the n+1th pixel 14d are preferably the same signal. In other words, the n+1th scan line $S_{n+1}$ and n+2th scan line $S_{n+2}$ are connected to the same scan line terminal of a driving IC for generating scan signal so as to save cost. In other embodiments, the second scan signal of the n-th pixel 14c and the first scan signal of the n+1th pixel 14d are not necessarily the same signal. In other words, the n+1th scan line $S_{n+1}$ and n+2th scan line $S_{n+2}$ are not connected to the same driving IC. Yet in other embodiments, the second scan signal of the n-th pixel 14c and the first scan signal of the n+1th pixel 14d can both be provided by the n+1th scan line $S_{n+1}$.

The common electrode 17 is connected to the first common voltage VC1, and the storage capacitor electrode 15 is connected to the second common voltage VC2. A liquid crystal capacitive voltage divider CL is formed between the third pixel electrode 23 and the common electrode 17 with the liquid crystal layer 12 as media. A first liquid crystal capacitor CL1 is formed between the first pixel electrode 21 and the common electrode 17 with the liquid crystal layer 12 as media; a first storage capacitor Cs1 is formed between the first pixel electrode 21 and the storage capacitor electrode 15 with the insulation layer 16 as media; a second liquid crystal capacitor CL2 is formed between the second pixel electrode 22 and the common electrode 17 with the liquid crystal layer 12 as media; and a second storage capacitor Cs2 is formed between the second pixel electrode 22 and the storage capacitor electrode 15 with the insulation layer 16 as media. The liquid crystal capacitive voltage divider CL is for lowering the voltage level at the second pixel electrode 22 so that the voltage level at the second pixel electrode 22 is different from the voltage level at the first pixel electrode 21 when the first thin-film transistor T1, the second thin-film transistor T2 and the third thin-film transistor T3 are all conductive. The first thin-film transistor T1 being conductive means that the source and the drain are conductive. Similarly, the second thin-film transistor T2 and the third thin-film transistor T3 being conductive means that the respective source and the drain of the second thin-film transistor T2 and the third thin-film transistor T3 are conductive.

The following refers to drawings and embodiments to describe the operation of the pixel structure of the present invention.

As shown in FIG. 2, the n-th pixel 14c is used for explanation. When the first scan signal on the n-th scan line $S_n$ controls the first thin-film transistor T1 and the second thin-film transistor T2 to become conductive, and the second scan signal on the n+1 scan line $S_{n+1}$ controls the third thin-film transistor T3 to become cut-off, the first pixel electrode 21 and the second pixel electrode 22 form a first equivoltage level V1 (V1 in FIG. 2). Then, when the second scan signal controls the third thin-film transistor to become conductive, the liquid crystal capacitive voltage divider CL accumulates charges to share a partial voltage for the second pixel electrode 22 so that the voltage level at the first pixel electrode 21 is different from the voltage level at the second pixel electrode 22 to achieve the conventional low skew design in the pixel structure.

Specifically, in the instant embodiment, at this point, the second pixel electrode 22 and the third pixel electrode 23 form a second equivoltage level V1 (V2 in FIG. 2). The relation between the first equivoltage level V1 and the second equivoltage level V2 can be obtained from the capacitive voltage division equation:

$$V2 = V1(CL2 + Cs2)/(Cl2 + Cs2 + 2CL) \quad (1)$$

As shown in (1), V2<V1; in other words, the voltage level at the first pixel electrode 21 is different from the voltage level at the second pixel electrode 22, and the conventional low skew design requirement in the pixel structure is achieved. As such, when the voltage level at the first pixel electrode 21 is different from the voltage level at the second pixel electrode 22, the color distortion at large viewing angle for the liquid crystal display panel will be reduced. The instant embodiment does not dispose capacitor on the array substrate; and therefore, the aperture ratio of the liquid crystal display panel is not affected.

Figure 3:
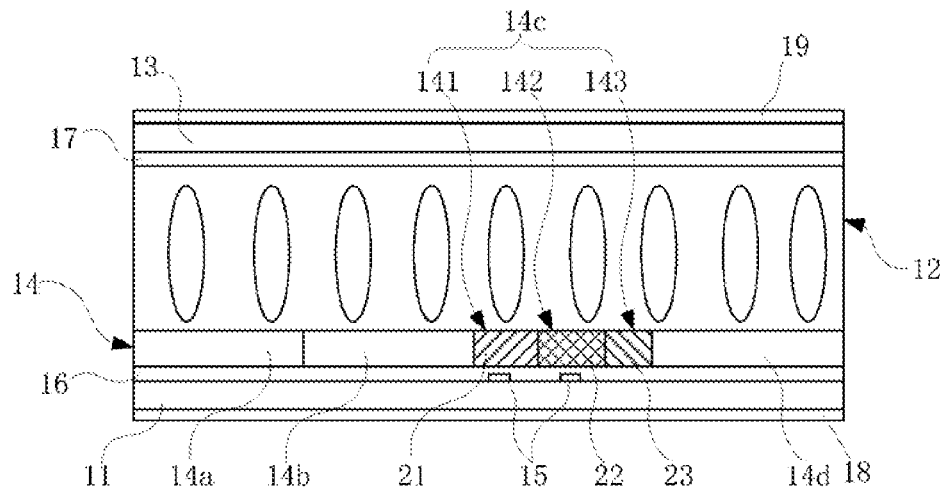
FIG. 3 is a schematic view showing the structure of the liquid crystal display panel according to the present invention.

Referring to FIG. 3, FIG. 3 is a schematic view showing the structure of the liquid crystal display panel according to the present invention. In the instant embodiment, the liquid crystal display panel comprises: a pixel structure 10, a first polarizer 18 and the second polarizer 19; wherein the pixel structure 10 can be the pixel structure 10 of any previous embodiment. The first polarizer 18 is disposed underneath the array substrate 11, and the second polarizer 19 is disposed above the color filter substrate 13.

Figure 4:
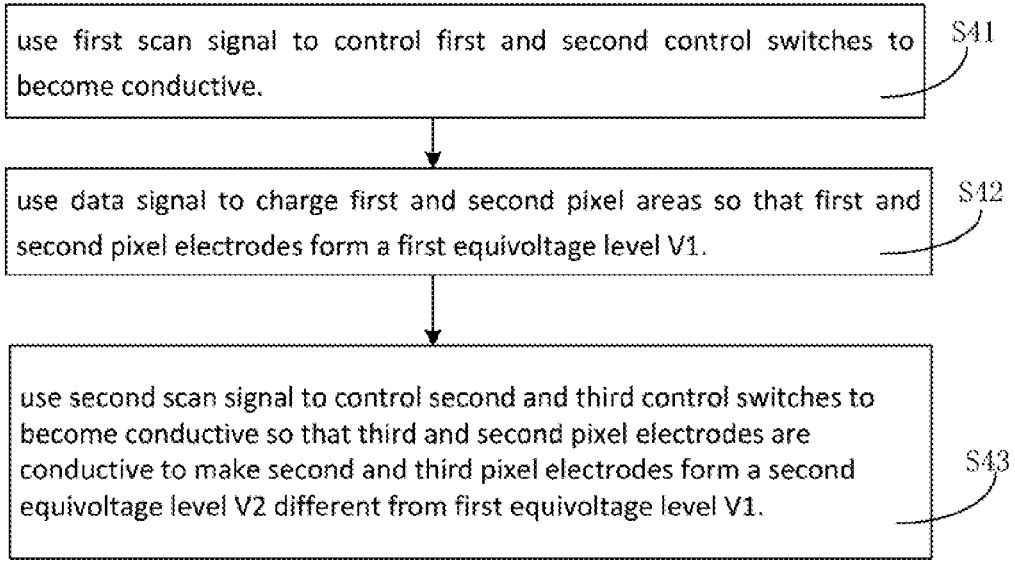
FIG. 4 is flowchart showing the driving method of the liquid crystal display panel according to the present invention.

FIG. 4 is flowchart showing the driving method of the liquid crystal display panel according to the present invention.

Step S41: using the first scan signal to control the first control switch and the second control switch to become conductive.

Step S42: using the data signal to charge the first pixel area and the second pixel area so that the first pixel electrode and the second pixel electrode forming a first equivoltage level V1.

Step S43: using the second scan signal to control the second control switch and the third control switch to become conductive so that the third pixel electrode and the second pixel electrode are conductive to make the second pixel electrode and the third pixel electrode forming a second equivoltage level V2 different from the first equivoltage level V1.

Compared to known technique, through the deposition of the third pixel area, the present invention utilizes the liquid crystal capacitive voltage divider formed between the third pixel electrode and the common electrode to lower the voltage level of the second pixel area so that the first pixel area and the second pixel area have different voltage levels. As such, the present invention realizes low skew effect without reducing aperture ratio of the pixel structure so as to avoid color distortion problem at a large viewing angle.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A pixel structure, which comprises a plurality of pixel units arranged in a matrix form;
   each of the pixel units further comprising: a first pixel area, a second pixel area and a third pixel area, adjacently disposed; wherein:
   the first pixel area further comprising: a first pixel electrode and a first control switch, and the first pixel electrode connected to a data signal through the first control switch;
   the second pixel area further comprising: a second pixel electrode and a second control switch, and the second pixel electrode connected to a data signal through the second control switch; the control terminal of the first control switch and the control terminal of the second control switch being both connected to a first scan signal;
   the third pixel area further comprising: a third pixel electrode and a third control switch, and the third pixel electrode connected to a data signal sequentially through the third control switch and the second control switch; the control terminal of the third control switch connected to a second scan signal; the third pixel electrode connected to the second pixel electrode through the third control switch so as to make the voltage level at the first pixel electrode different from the voltage level at the second pixel electrode when the first control switch, the second control switch and the third control switch being all conductive;
   the pixel structure further comprises an array substrate and a color filter substrate, disposed oppositely, and a liquid crystal layer sandwiched between the array substrate and the color filter substrate; the array substrate comprises a plurality of scan lines disposed transversely, and a plurality of data lines disposed longitudinally; the scan lines intersects with the data lines; wherein:
   the first pixel area of the n-th pixel is disposed in the area surrounded by the n−1th scan line, n-th scan line, n-th data line and n+1th data line;
   the second pixel area of the n-th pixel is disposed in the area surrounded by the n-th scan line, n+1th scan line, n-th data line and n+1th data line;
   the third pixel area of the n-th pixel is disposed in the area surrounded by the n+1th scan line, n+2th scan line, n-th data line and n+1th data line;
   the n-th data line is to provide the data signal to the n-th pixel; the n-th scan line is to provide the first scan signal to the n-th pixel; and the n+1th scan line is to provide the second scan signal to the n-th pixel.

2. The pixel structure as claimed in claim 1, wherein the first pixel area, the second pixel area and the third pixel area are disposed on the array substrate; the color filter substrate is disposed with common electrode; a liquid crystal capacitive voltage divider is formed between the third pixel electrode and the common electrode with the liquid crystal layer as media; the liquid crystal capacitive voltage divider is for lowering the voltage level at the second pixel electrode so that the voltage level at the second pixel electrode is different from the voltage level at the second pixel electrode when the first control switch, the second control switch and the third control switch are all conductive.

3. The pixel structure as claimed in claim 2, wherein the array substrate further comprises an insulation layer and a storage capacitor electrode, disposed sequentially underneath the first pixel electrode and the second pixel electrode; wherein:
   a first liquid crystal capacitor is formed between the first pixel electrode and the common electrode with the liquid crystal layer as media; a first storage capacitor is formed between the first pixel electrode and the storage capacitor electrode with the insulation layer as media;
   a second liquid crystal capacitor is formed between the second pixel electrode and the common electrode with the liquid crystal layer as media; a second storage capacitor is formed between the second pixel electrode and the storage capacitor electrode with the insulation layer as media; the common electrode is connected to a first common voltage and the storage capacitor electrode is connected to a second common voltage.

4. The pixel structure as claimed in claim 1, wherein the first control switch is a first thin-film transistor; the second control switch is a second thin-film transistor; the third control switch is a third thin-film transistor; the first pixel electrode is connected to the drain of the first thin-film transistor; the source of the first thin-film transistor is connected to the data signal; the gate of the first thin-film transistor is connected to the first scan signal; the second pixel electrode is connected to the drain of the second thin-film transistor; the source of the second thin-film transistor is connected to the data signal; the gate of the second thin-film transistor is connected to the first scan signal; the third pixel electrode is connected to the drain of the third thin-film transistor; the source of the third thin-film transistor is connected to drain of the second thin-film transistor; and the gate of the third thin-film transistor is connected to the second scan signal.

5. The pixel structure as claimed in claim 1, wherein the second scan signal of the n-th pixel and the first scan signal of the n+1th pixel are the same signal.

6. A liquid crystal display panel, which comprises: a pixel structure, the pixel structure further comprising: a plurality of pixel units arranged in a matrix form; each of the pixel units further comprising: a first pixel area, a second pixel area and a third pixel area, adjacently disposed; wherein:
   the first pixel area further comprising: a first pixel electrode and a first control switch, and the first pixel electrode connected to a data signal through the first control switch;
   the second pixel area further comprising: a second pixel electrode and a second control switch, and the second pixel electrode connected to a data signal through the second control switch; the control terminal of the first control switch and the control terminal of the second control switch being both connected to a first scan signal;
   the third pixel area further comprising: a third pixel electrode and a third control switch, and the third pixel electrode connected to a data signal sequentially through the third control switch and the second control switch; the control terminal of the third control switch connected to a second scan signal; the third pixel electrode connected to the second pixel electrode through the third control switch so as to make the voltage level at the first pixel electrode different from the voltage level at the second pixel electrode when the first control switch, the second control switch and the third control switch being all conductive;
   the pixel structure further comprises an array substrate and a color filter substrate, disposed oppositely, and a liquid crystal layer sandwiched between the array substrate and the color filter substrate; the array substrate comprises a plurality of scan lines disposed transversely, and a plurality of data lines disposed longitudinally; the scan lines intersects with the data lines; wherein:

the first pixel area of the n-th pixel is disposed in the area surrounded by the n−1th scan line, n-th scan line, n-th data line and n+1th data line;

the second pixel area of the n-th pixel is disposed in the area surrounded by the n-th scan line, n+1th scan line, n-th data line and n+1th data line;

the third pixel area of the n-th pixel is disposed in the area surrounded by the n+1th scan line, n+2th scan line, n-th data line and n+1th data line;

the n-th data line is to provide the data signal to the n-th pixel; the n-th scan line is to provide the first scan signal to the n-th pixel; and the n+1th scan line is to provide the second scan signal to the n-th pixel.

7. The liquid crystal display panel as claimed in claim 6, wherein the first pixel area, the second pixel area and the third pixel area are disposed on the array substrate; the color filter substrate is disposed with common electrode; a liquid crystal capacitive voltage divider is formed between the third pixel electrode and the common electrode with the liquid crystal layer as media; the liquid crystal capacitive voltage divider is for lowering the voltage level at the second pixel electrode so that the voltage level at the second pixel electrode is different from the voltage level at the second pixel electrode when the first control switch, the second control switch and the third control switch are all conductive.

8. The liquid crystal display panel as claimed in claim 7, wherein the array substrate further comprises an insulation layer and a storage capacitor electrode, disposed sequentially underneath the first pixel electrode and the second pixel electrode; wherein:

a first liquid crystal capacitor is formed between the first pixel electrode and the common electrode with the liquid crystal layer as media; a first storage capacitor is formed between the first pixel electrode and the storage capacitor electrode with the insulation layer as media;

a second liquid crystal capacitor is formed between the second pixel electrode and the common electrode with the liquid crystal layer as media; a second storage capacitor is formed between the second pixel electrode and the storage capacitor electrode with the insulation layer as media; the common electrode is connected to a first common voltage and the storage capacitor electrode is connected to a second common voltage.

9. The liquid crystal display panel as claimed in claim 6, wherein the first control switch is a first thin-film transistor; the second control switch is a second thin-film transistor; the third control switch is a third thin-film transistor; the first pixel electrode is connected to the drain of the first thin-film transistor; the source of the first thin-film transistor is connected to the data signal; the gate of the first thin-film transistor is connected to the first scan signal; the second pixel electrode is connected to the drain of the second thin-film transistor; the source of the second thin-film transistor is connected to the data signal; the gate of the second thin-film transistor is connected to the first scan signal; the third pixel electrode is connected to the drain of the third thin-film transistor; the source of the third thin-film transistor is connected to drain of the second thin-film transistor; and the gate of the third thin-film transistor is connected to the second scan signal.

10. The liquid crystal display panel as claimed in claim 6, wherein the second scan signal of the n-th pixel and the first scan signal of the n+1th pixel are the same signal.

11. A driving method of liquid crystal display panel, the liquid crystal display panel, which comprises: a pixel structure, the pixel structure further comprising: a plurality of pixel units arranged in a matrix form; each of the pixel units further comprising: a first pixel area, a second pixel area and a third pixel area, adjacently disposed; the first pixel area further comprising: a first pixel electrode and a first control switch, and the first pixel electrode connected to a data signal through the first control switch; the second pixel area further comprising: a second pixel electrode and a second control switch, and the second pixel electrode connected to a data signal through the second control switch; the control terminal of the first control switch and the control terminal of the second control switch being both connected to a first scan signal; the third pixel area further comprising: a third pixel electrode and a third control switch, and the third pixel electrode connected to a data signal sequentially through the third control switch and the second control switch; the third pixel electrode connected to the second pixel electrode through the third control switch; the control terminal of the third control switch connected to a second scan signal; the driving method of the liquid crystal display panel comprises:

using the first scan signal to control the first control switch and the second control switch to become conductive;

using the data signal to charge the first pixel area and the second pixel area so that the first pixel electrode and the second pixel electrode forming a first equivoltage level V1; and using the second scan signal to control the second control switch and the third control switch to become conductive so that the third pixel electrode and the second pixel electrode are conductive to make the second pixel electrode and the third pixel electrode forming a second equivoltage level V2 different from the first equivoltage level V1.

12. The driving method of liquid crystal display panel as claimed in claim 11, wherein the pixel structure comprises an array substrate and a color filter substrate, disposed oppositely, and a liquid crystal layer sandwiched between the array substrate and the color filter substrate; the array substrate further comprises an insulation layer and a storage capacitor electrode, disposed sequentially underneath the first pixel electrode and the second pixel electrode; wherein the color filter substrate is disposed with common electrode; the first pixel area, the second pixel area and the third pixel area are disposed on the array substrate; a liquid crystal capacitive voltage divider CL is formed between the third pixel electrode and the common electrode with the liquid crystal layer as media; a first liquid crystal capacitor CL1 is formed between the first pixel electrode and the common electrode with the liquid crystal layer as media; a first storage capacitor Cs1 is formed between the first pixel electrode and the storage capacitor electrode with the insulation layer as media; a second liquid crystal capacitor CL2 is formed between the second pixel electrode and the common electrode with the liquid crystal layer as media; a second storage capacitor Cs2 is formed between the second pixel electrode and the storage capacitor electrode with the insulation layer as media; the first equivoltage level V1 and the second equivoltage level V2 ahs the relation:

$$V2=V1(CL2+Cs2)/(CL2+Cs2+2CL).$$

13. The driving method of liquid crystal display panel as claimed in claim 11, wherein the common electrode is connected to a first common voltage and the storage capacitor electrode is connected to a second common voltage.

* * * * *